4,584,712
4/22/86

United States Patent [19]
Isobe et al.

[11] Patent Number: 4,584,712
[45] Date of Patent: Apr. 22, 1986

[54] INTERFERENCE SIGNAL SUPRESSOR SYSTEM

[75] Inventors: Seiji Isobe, Kawasaki; Makoto Kaijima, Yokohama, both of Japan

[73] Assignee: Kabushiki Kaisha Toshiba, Japan

[21] Appl. No.: 669,363

[22] Filed: Nov. 8, 1984

[30] Foreign Application Priority Data

Dec. 21, 1983 [JP] Japan ............................ 58-241385

[51] Int. Cl.$^4$ .............................................. H04B 1/10
[52] U.S. Cl. .................... 455/273; 455/276; 455/278; 455/260
[58] Field of Search ............... 455/272, 273, 276, 278, 455/283, 284, 304, 305, 260; 343/380–384

[56] References Cited

U.S. PATENT DOCUMENTS 3,737,783 6/1973 Oswald et al. ............... 455/278
3,784,915 1/1974 Oswald et al. ............... 455/278
3,876,947 4/1975 Giraudon ..................... 455/278

FOREIGN PATENT DOCUMENTS 154947 9/1982 Japan .
21141 2/1984 Japan .

Primary Examiner—Jin F. Ng
Attorney, Agent, or Firm—Finnegan, Henderson, Farabow, Garrett & Dunner

[57] ABSTRACT

An interference signal suppressor includes two antennas for receiving desired signals and interference signals, a first adder circuit in which the output signals of two antennas are added to each other, a subtractor circuit in which the output signal of two antennas are subtracted to each other, a signal generating circuit for producing an opposite phase signal with that of the interference signal provided from the first adder circuit and the opposite phase signal are added to each other and a controlling circuit for adjusting the amplitude and the phase of the opposite phase signal to suppress the interference signal.

5 Claims, 9 Drawing Figures

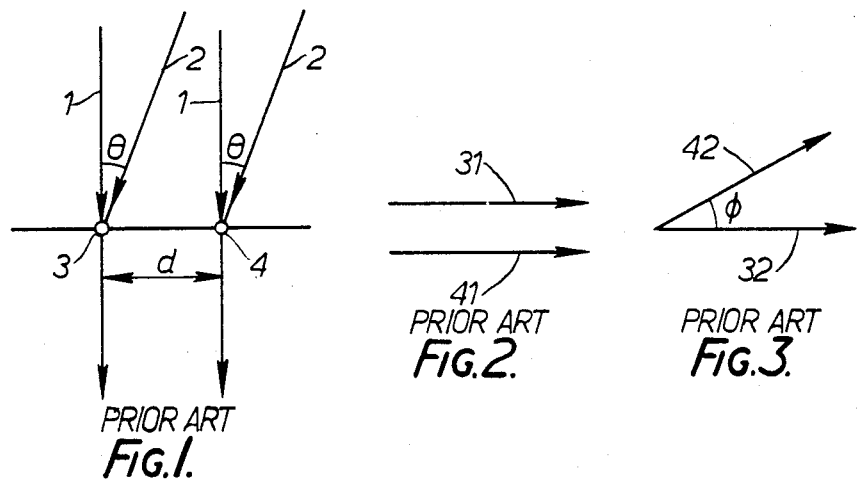
PRIOR ART
FIG.1.
PRIOR ART
FIG.2.
PRIOR ART
FIG.3.
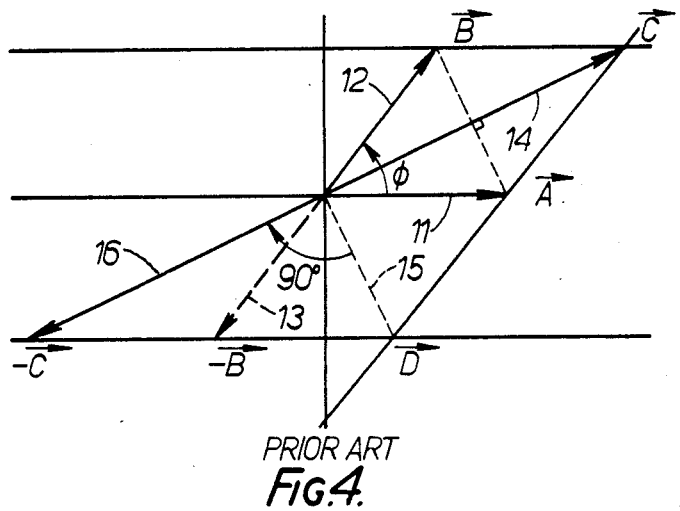
PRIOR ART
FIG.4.
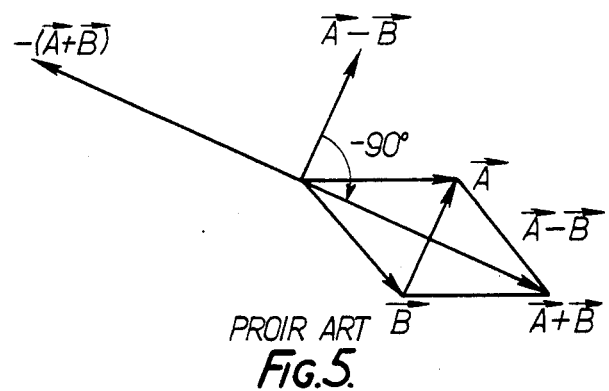
PRIOR ART
FIG.5.

4,584,712

INTERFERENCE SIGNAL SUPRESSOR SYSTEM

BACKGROUND OF THE INVENTION

The present invention relates to an interference signal suppressor which is enabled to eliminate unnecessary interference signals other than the desired broadcast waves of a key station in a TV translator.

DESCRIPTION OF THE PRIOR ART

TV broadcasting translators tend to receive not only the desired signals transmitted from a key station but also unnecessary interference signals within its receivable band so that the interference signals appear as a beating image or sound to degrade the broadcasting quality.

In order to suppress the interference signals. there has been developed a method, in which two receiving antennas are used.

FIG. 1 to FIG. 4 are diagrams showing the principle on which an interference signal is eliminated by using two receiving antennas.

Those two receiving antennas 3 and 4 are positioned at a predetermined spacing d perpendicular to the receiving direction of the desired signals 1 so that the desired signals 1 are in phase whereas the interference signals 2 are out of phase by $$\emptyset \left( \emptyset = \frac{2f}{C} \cdot d \cdot \sin \theta \right)$$

at the respective receiving antennas 3 and 4. In FIG. 2 vectors 31 and 41 show the desired signals 1 at the receiving antennas 3 and 4 shown in FIG. 1. In FIG. 3 vectors 32 and 42 show the interference signals 2 at the receiving antennas 3 and 4 shown in FIG. 1.

As shown in FIG. 4, reference numeral 11 indicates the vector $\vec{A}$ of the interference signal at one receiving antenna, whereas reference numeral 12 indicates the vector $\vec{B}$ of the interference signal at another receiving antenna. Numeral 13 indicates the vector $-\vec{B}$ which is prepared by inverting the phase of the vector $\vec{B}$ at the antenna 4. The vector 14 indicates the sum of the vectors $\vec{A}$ and $\vec{B}$ of the interference signals, i.e., the vector $\vec{A}+\vec{B}$ (i.e., the sum vector $\vec{C}$).

On the other hand, the vector 15 is the difference between the vectors $\vec{A}$ and $\vec{B}$ of the interference signal, i.e., the vector $\vec{A}-\vec{B}$ (i.e., the differential vector $\vec{D}$). Reference numeral 16 indicates a vector (i.e., $-\vec{C}$) which is derived by rotating the $\vec{A}$, $\vec{B}$ difference vector $\vec{D}$ of the interference signal clockwise by 90 degrees and by multiplying the delayed difference vector $\vec{D}$ by m times such that the vector 16 is of opposite phase and of the same amplitude as the sum vector $\vec{C}$.

The interference signal level of the output of the receiving antenna 3 and the interference signal level of the output of the receiving antenna 4 are substantially equal, because the spacing d between the two antennas 3 and 4 is about λ (i.e., one wavelength), so that the vectors 14 and 15 always intersect at a right angle.

As a result, the interference signal can be suppressed if the vector $\vec{D}$ is added to the vector $\vec{C}$ after it has been phaseshifted by 90 degrees and multiplied by the m times.

In case the orientation of arrival of the interference signal is changed from the righthand side, as shown in FIG. 1, to the lefthand side, the interference signal is not eliminated. In this case, the orientation of vector $\vec{B}$ varies, so that the vector diagram of FIG. 5 is obtained.

If, in this case, the difference vector $\vec{A}-\vec{B}$ of the vector $\vec{A}$ and $\vec{B}$ is phase-shifted by 90 degrees and is added to the sum of the vectors $\vec{A}$ and $\vec{B}$, the interference signal is rather emphasized because the orientations of the vectors $\vec{A}+\vec{B}$ and vectors $\vec{A}-\vec{B}$ are aligned.

SUMMARY OF THE INVENTION

An object of this invention is, therefore, to provide an interference signal suppressor which can eliminate the interference signals regardless of arriving direction of the interference signals.

In order to achieve the above object of the present invention, an interference signal suppressor is provided comprising two receiving antennas which are spaced from each other and receive desired signals and interference signals whose frequency is different from the desired signals, first adder means in which signals received by the two antennas are added to each other to produce a signal including a first interference component signal, subtractor means in which signals received by the two antennas are subtracted to produce a second interference component signal, signal generating means having a mixer circuit for mixing the first interference component signal provided from the adder means with the second interference component signal provided from the subtacter means to generate a signal having an opposite phase with respect to that of the first interference component signal provided from the adder means, second adder means for eliminating the interference signal provided from the first adder means by adding the opposite phase signal to the signal provided from the first adder means to produce a signal including a residual interference component signal, and control means having a mixer circuit in which the residual interference component signal provided from the second adder means and the opposite phase signal are mixed to produce feedback control signals for adjusting the phase and amplitude of the opposite phase signal, whereby the residual interference component signal is suppressed by the application of the opposite phase signal to the second adder means.

BRIEF DESCRIPTION OF THE DRAWINGS

FIG. 1 to FIG. 5 are vector diagrams for explaining the opration of a conventional interference signal suppressor;

DESCRIPTION OF THE PREFERRED EMBODIMENT

The present invention will be described in connection with embodiments thereof, and with reference to the accompanying drawings.

Figure 6:
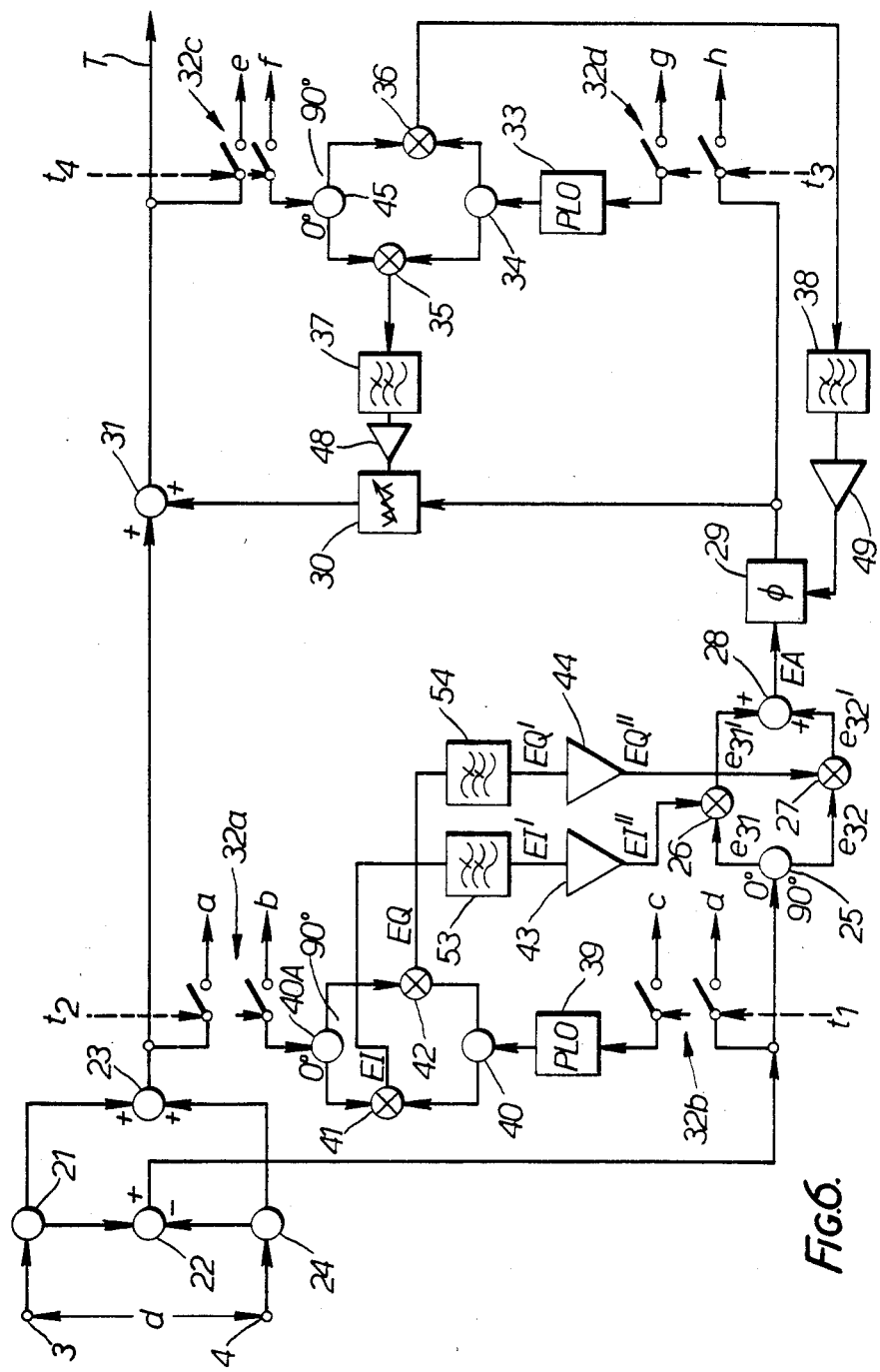
FIG. 6 is a block circuit diagram of an interference signal suppressor in accordance with one embodiment of the present invention.

In FIG. 6, two receiving antennas 3 and 4 are placed at a spacing d from each other perpendicular to the arriving direction of the desired signals.

The desired signal and interference signal which are modulated with a television signal and have different frequencies to each other, are received by the receiving antennas 3 and 4. Their signals are supplied, through the distributors 21 and 24, respectively, to the adder 23, in which they are added so that the added output is applied to an adder 31 and a high-frequency switch 32a.

Figure 7:
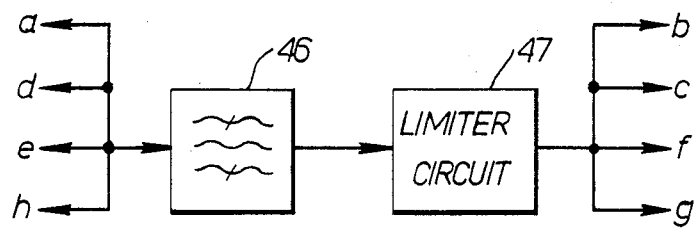
FIG. 7 and FIG. 8 are diagrams for explaining the FIG. 6 embodiment of the present invention.
Figure 8:
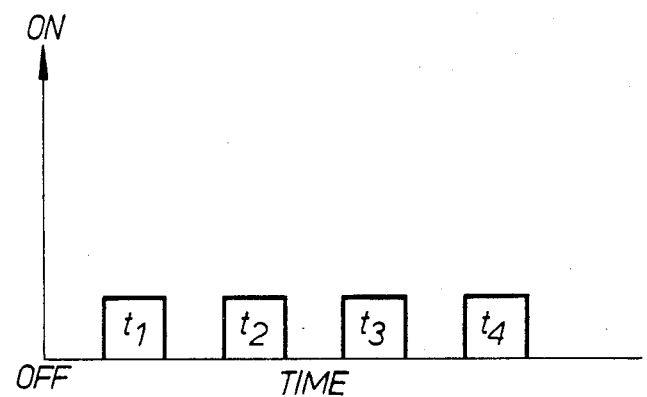

The terminals a and b of the switch 32a are closed at the timing t2 of FIG. 8 so that a band-pass filter 46 and a limiter circuit 47 are connected between the terminal a and b of the switch 32a, as shown in FIG. 7. This band-pass filter 46 has a frequency characteristic that passes an interference signal and interrupts a desired signal.

As a result, the interference signal included in the added signal provided from the adder 23 are applied to the 90 degrees splitter 40a through the switch 32a. The interference signal applied to the 90 degrees splitter 40A is applied in the same phase to the balanced mixer 41 and is applied after a phase shift of 90 degrees, to the balanced mixer 42.

The interference signal and desired signal received by the receiving antennas 3 and 4 are also respectively applied to the subtractor 22 through the distributors 21 and 24. In the subtractor 22 they are subtracted so that the desired signals cancel one another because they have the same phase and amplitude.

The interference difference signal provided from the subtractor 22 is applied to the high-frequency switch 32b and to the 90 degrees splitter 25.

The output signal of the subtractor 22 applied to the 90 degrees splitter 25 is sent out in the same phase to the balanced mixer 26 and is applied, after a phaseshift of 90 degrees, to the balanced mixer 27. The switch 32b closes during time t1 (FIG. 8), so that the band-pass filter 46 and the limiter circuit 47 are connected into the circuit, as shown in FIG. 7, during the interval. As a result, the output signal of the subtractor 22 applied to the switch 32b is supplied to the phase lock oscillator (PLO) 39 through the switch 32b.

This PLO 39 is an oscillator with a phase locked loop and generates an oscillation signal synchronized with and at the same frequency as the output of the subtractor 22 provided through the switch 32b during time interval t1 (FIG. 8). Upon termination of t1, the PLO 39 continues to generate the oscillation signal at the frequency set during t1.

The oscillation signal is applied to an in-phase splitter 40. The oscillation signal applied to the splitter 40 is divided and supplied to the balanced mixers 41 and 42 in the same phase, respectively.

In the balanced mixers 41 and 42, the signal provided from the 90 degrees splitter 40a and the oscillation signals provided from the distributor 40 are mixed with each other, respectively.

The high frequency components of the mixed outputs EI and EQ provided from the mixers 41 and 42 are suppressed by the filters 53 and 54, respectively.

Low frequency component signals of mixed outputs EI' and EQ' are supplied to the mixers 26 and 27 through the amplifiers 43 and 44. These amplifiers 43 and 44 are amplifiers with sample and hold circuits for holding the output signal level at time t2 of FIG. 8.

In the mixers 26 and 27, low frequency component signals EI'' and EQ'' provided from the amplifiers 43 and 44 and the output signal from subtractor 22 fed through 90 degree splitter 25 are mixed with each other, respectively. The mixed signals provided from the mixers 26 and 27 are supplied to the adder 28 so that these signals are added.

The added signal provided from the adder 28 has the same amplitude and the opposite phase with respect to that of the interference signal provided from the adder 23.

The signal provided from the adder 28, will be explained in the following by using formulas.

For exmaple, the interference component signal $e_1$ is expressed by the following equation, $$e_1 = \cos wt \qquad (1)$$

The oscillation signal $e_3$ provided from the PLO is expressed by the following equation $$e_3 = \cos(wt + \theta) \qquad (2)$$

Therefore, the outputs EI and EQ of the mixers 41 and 42 are expressed by the following equation, $$EI = \cos wt \cdot \cos(wt + \theta) \qquad (3)$$
$$= \tfrac{1}{2}\{\cos(-\theta) + \cos(2wt + \theta)\}$$

$$EQ = \cos\left(wt + \frac{\pi}{2}\right) \cdot \cos(wt + \theta) \qquad (4)$$

$$= \tfrac{1}{2}\cos\left(\frac{\pi}{2} - \theta\right) + \cos\left(2wt + \frac{\pi}{2} + \theta\right)$$

The high frequency component (frequency=2w of signals EI and EQ is rejected by filters 53 and 54 so that the outputs EI' and EQ' are expressed by the following equations:

$$EI' = \tfrac{1}{2}\cos(-\theta) \qquad (5)$$

$$EQ' = \tfrac{1}{2}\cos\left(\theta - \frac{\pi}{2}\right) \qquad (6)$$

Here, the gains of amplifiers 43 and 44 are $-2$ and 2, respectively, so that the outputs EI'' of the amplifiers 43 and 44, are expressed by the following equations:

$$EI'' = -\cos\theta \qquad (7)$$

$$EQ'' = \sin\theta \qquad (8)$$

On the other hand, the signals e31 and e32 supplied to the mixers 26 and 27 through the 90 degree splitter 25 are expressed by the following equations:

$$e_{31} = \cos(wt + \theta) \qquad (9)$$

$$e_{32} = \cos\left(wt + \theta + \frac{\pi}{2}\right) \qquad (10)$$

Therefore, the output signals $e_{31}'$ and $e_{32}'$ of the mixers 26 and 27 are expressed by the following equations:

$$e_{31}' = \cos(wt + \theta) \times (-\cos\theta) \qquad (11)$$

$$e_{32}' = \sin\theta \times \cos\left(wt + \theta + \frac{\pi}{2}\right) \qquad (12)$$
$$= -\sin\theta \times \sin(wt + \theta)$$

From the above, the added signal E provided from the adder 28 is expressed by the following equation:

$$E_a = e_{31}' + e_{32}' = -\cos wt \quad (13)$$

From the above, it can be understood that the output signals $E_a$ ($E_a = -\cos wt$) of the adder 28 has the same amplitude and the opposite phase with respect to that of the interference signal $e_1$ ($e_1 = \cos wt$) provided from the adder 23.

Accordingly, in the adder 31 if the added output signal of the adder 23 and the added output signal of the adder 28 are added, the interference signal component included in the added output signal of the adder 23 are suppressed so that only the desired signals are provided from the adder 31 to the output terminal T. However, the phase error, which is caused as a result of phase variations occurring at the balanced mixers 26, 27, 41 and 42 and splitters 25, 28, 40 and 40A is left so that the phases of both signals are not always held inverse to one another.

In order to eliminate this problem, according to the present invention, a feedback circuit including balanced mixers is used to adjust the phase of the summed output signal of the adder 28.

The feedback circuit mentioned above had balanced mixers which compare the amplitude and the phase of the output signal of the adder 23 with those of the summed output signal of adder 28 and control the amplitude and the phase of the summed output signal of adder 28 so that it becomes of equal amplitude and opposite phase with respect to the added output signal of adder 23 to suppress the residual interference signal.

The feedback circuit according to the present invention will be explained in detail as follows.

The output $E_A$ of the adder 28 is supplied to the high frequency switch 32d and a variable attenuator 30 through the variable phase shifter 29.

The terminals g and h of the switch 32d are closed at time t3 (FIG. 3), so that the band-pass filter 46 and the limiter circuit 47 (FIG. 7) are connected between terminals g and h. As a result, the output a signal $E_A$ supplied to the switch 32d is applied to the phase lock oscillator (PLO) 33 through the switch 32d so that the PLO 33, similar to the PLO 39, generates an oscillating signal synchronized with the output signal EA.

This oscillating signal is supplied to the balanced mixers 35 and 36 through a distributor 34. The portion of the residual interference signal which is not suppressed in the adder 31, is supplied to the high frequency switch 32c.

The terminals e and f of the switch 32c are closed at time t4 (FIG. 8) so that the band-pass filter 46 and the limiter circuit 47 are connected between terminals e and f, as shown in FIG. 7. As a result, the interference signal supplied to the switch 32c is applied to the 90 degrees splitter 45 through the switch 32c. The output of the 90 degrees splitter 45 is applied to the mixer 35 and is applied, after its phase has been shifted by 90 degrees, to the balanced mixer 36.

In the mixers 35 and 36, the signal provided from the 90 degrees splitter 45 and the signal provided from the distributor 34 are mixed.

The output signals of the mixers 35 and 36 are supplied to the low-pass filters 37 and 38, respectively, in which only the low frequency components are extracted and applied to the amplifiers 48 and 49, respectively. These amplifiers 48 and 49 are amplifiers with sample and hold circuit for holding the output signal level at time t4 of FIG. 8.

The output signal of the amplifier 48 is supplied to the variable attenuator 30. The output signal supplied to the attenuator 30 controls the attenuation of the signal EA through the phase shifter 29 such that the amplitude of the signal EA becomes equal to that of the output signal of adder 23.

When both amplitudes are equal to each other, the output signal of the mixer 35 becomes zero.

At the same time, the output signal of the amplifier 49 is supplied to the variable phase shifter 29. The output signal supplied to the phase shifter 29 controls the phase of the summed signal EA such as the phase of the output signal EA of adder 28 becomes opposite to that of the output signal of adder 23.

When both phases are opposite to each other, the output signal of the mixer 36 becomes zero.

According to the operation of the feedback circuit, the output signal EA of adder 28 is of equal amplitude and oposite phase with respect to that of the interference signal provided from the adder 23.

As a result, both signals are added in the adder 31 so that the interference signal is supressed, whereupon the desired signal is supplied to the output terminal T.

Figure 9:
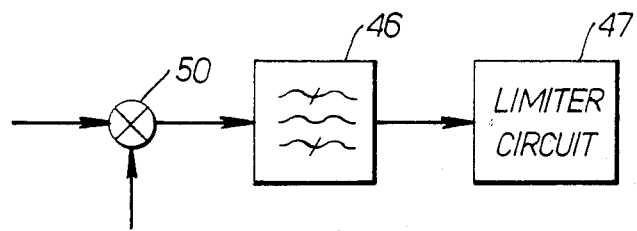
FIG. 9 is a block circuit diagram showing another embodiment of the present invention.

In FIG. 7, at the front stage of the band-pass filter 46, a balanced mixer 50 may be added, as shown in FIG. 9. In case a mixer 50 is added, the signals introduced at terminals a, d, e or h have their frequencies converted so that they may be added in the base band region to the band-pass filter 46.

The high-frequency switches 32a to 32d are turned on and off sequentially at such timing as shown in FIG. 8.

It will be apparent to those skilled in the art that various modifications and variations could be made to the embodiments of the invention as hereinabove described without departing from the spirit and scope of the invention.

What is claimed is:

1. An interference signal suppressor comprising:

two receiving antennas which are spaced from each other and receive desired signals and interference signals whose frequencies are different from said desired signals;

first adder means in which signals received by said two antennas are added to each other to produce a signal including a first interference component signal;

subtractor means in which signals received by said two antennas are subtracted to produce a second interference component signal;

signal generating means having a mixer circuit for mixing said first interference component signal provided from said first adder means with said second interference component signal provided from said subtractor means to generate a signal having an opppsite phase with respect to that of said first interference component signal provided from said first adder means;

second adder means for eliminating said interference signal provided from said first adder means by adding said opposite phase signal to said signal provided from said first adder means to produce a signal including a residual interference component signal; and control means having a mixer circuit in which said residual interference component signal provided from said second adder means and said opposite phase signal are mixed to produce feedback control signals for adjusting the phase and amplitude of said opposite phase signal, whereby said residual interference component signal is suppressed by the application of the opposite phase signal to the second adder means.

2. The interference signal suppressor as defined in claim 1 wherein said two receiving antennas are spaced apart from each other and are placed at right angles to the receiving direction of said desired signal.

3. The interference signal suppressor asdefined in claim 1 wherein said desired signals are television broadcasting signals.

4. The interference signal suppressor as defined in claim 1 wherein said control means comprise a phase locked oscillator which generates an oscillation signal synchronized with said opposite phase signal, a distributor distributing said oscillation signal in the same phase, respectively, a 90 degrees splitter distributing said residual interference signal in the same phase and with a phase shift of 90 degrees, respectively, said mixing circuit comprising a plurality of mixing means for mixing said oscillation signal distributed by said distributor with said residual interference signal distributed by said 90 degrees splitter to produce said feedback control signals.

5. The interference signal suppressor as defined in claim 4 wherein said control means include a first switch introducing said residual interference signal to said 90 degrees splitter and having two terminals, a second switch introducing said opposite phase signal to said phase locked oscillator and having two terminals and a filter selectively connected between said two terminals of said first or second switch.

* * * * *